US006774354B2

(12) United States Patent
Ames

(10) Patent No.: US 6,774,354 B2
(45) Date of Patent: Aug. 10, 2004

(54) FIBER OPTIC PITCH OR ROLL SENSOR

(75) Inventor: Gregory H. Ames, Wakefield, RI (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 09/983,047

(22) Filed: Oct. 15, 2001

(65) Prior Publication Data

US 2003/0071202 A1 Apr. 17, 2003

(51) Int. Cl.[7] .................................................. G01J 1/04
(52) U.S. Cl. ..................................... 250/227.14; 385/13
(58) Field of Search ........................ 250/227.14, 227.18, 250/227.16, 227.17, 227; 73/760, 768, 774, 800, 807, 814, 820, 826; 356/32; 385/10, 12, 13; 340/555, 556, 557

(56) References Cited

U.S. PATENT DOCUMENTS 6,218,661 B1 * 4/2001 Schroeder et al. ..... 250/227.14

* cited by examiner

*Primary Examiner*—Edward J. Glick
*Assistant Examiner*—Courtney Thomas
(74) *Attorney, Agent, or Firm*—James M. Kasischke; Michael F. Oglo; Jean-Paul A. Nasser

(57) ABSTRACT

The present invention relates to a fiber optic sensing device having utility as a roll sensor and/or a pitch sensor. The sensing device comprises at least one optical fiber supported in a structure, a movable mass supported within the structure, and at least one detector for detecting changes in tension in the at least one optical fiber due to movement of the movable mass. In the sensor of the present invention, the optical fiber(s) are the only deformable structures, thus maximizing sensitivity.

8 Claims, 2 Drawing Sheets

FIBER OPTIC PITCH OR ROLL SENSOR

CROSS REFERENCE TO OTHER PATENTS

This patent application is co-pending with two related patent applications entitled MULTIPLEXED FIBER LASER SENSOR SYSTEM, U.S. patent application Ser. No. 09/983,046 which has been allowed and is now U.S. Pat. No. 6,563,969, and FIBER OPTIC CURVATURE SENSOR FOR TOWED HYDROPHONE ARRAYS, by the same inventor as this application.

STATEMENT OF GOVERNMENT INTEREST

The invention described herein may be manufactured and used by or for the Government of the United States of America for governmental purposes without the payment of royalties thereon or therefore.

BACKGROUND OF THE INVENTION (1) Field of the Invention

This invention relates to a device for sensing the local gravitational field so as to provide a roll or pitch sensor. The device of the present invention, in combination with other sensors, may be used to determine the shape of a towed hydrophone array.

(2) Description of the Prior Art

Sensors which employ optical fibers to measure physical motion of a structure are known in the prior art. For example, U.S. Pat. No. 4,788,868 to Wilk; U.S. Pat. No. 4,654,520 to Griffiths; and U.S. Pat. No. 4,812,645 to Griffiths illustrate structural monitoring systems using fiber optics. U.S. Pat. No. 4,806,012 to Meltz et al. illustrates a distributed, spatially resolving optical fiber strain gauge in which the core of the optical fiber is written with periodic grating patterns effective for transmitting and reflecting light injected into the core. Spectral shifts in the transmitted and reflected light indicate the intensity of the strain or temperature variations at positions of the grating corresponding to the associated wavelengths of injected light. U.S. Pat. No. 5,012,679 to Haefner illustrates an optical sensor which uses a beam waveguide embedded in a force or pressure transmitting material, in particular an elastomer. To be used as a force measuring sensor, the bean waveguide is mounted on an elastic deformable body and embedded in a material that does not undergo creep under the influence of a force. None of these sensors have utility as a roll or pitch sensor.

Some towed hydrophone arrays require precise determination of their shape in the water. This has been done in the past with gimbaled heading sensors. These devices are quite expensive. It is desirable to reduce cost in the towed array. Fiber optic hydrophone systems are under development and it is desirable to provide shape sensing that is compatible and that reduces the cost of the shape sensing.

An alternative way to determine array shape is by curvature sensors and either roll or twist sensors. Roll sensors have the advantage of sensing an absolute parameter at each point measured.

SUMMARY OF THE INVENTION

Accordingly, it is an object of the present invention to provide a fiber optic sensing device which may be used as a fiber optic roll sensor or as a fiber optic pitch sensor.

It is yet another object of the present invention to provide a fiber optic sensing device which may be used as a fiber optic roll sensor or as a fiber optic pitch sensor in a towed array.

It is a further object of the present invention to provide a sensing device as above which is simple and relatively inexpensive.

The foregoing objects are attained by the sensing device of the present invention.

In accordance with the present invention, a sensing device is provided which may be used as a roll sensor and/or as a pitch sensor. The sensing device broadly comprises at least one optical fiber supported in a structure, a movable mass supported within the structure, and means for detecting changes in tension in the at least one optical fiber due to movement of the movable mass. The only deformable structure in the sensing device of the present invention is the optical fiber(s), thereby maximizing sensitivity.

Other details of the sensing device of the present invention, as well as other objects and advantages attendant thereto, are set forth in the following detailed description and the accompanying drawings wherein like reference numerals depict like elements.

BRIEF DESCRIPTION OF THE PREFERRED EMBODIMENT(S)

Figure 1:
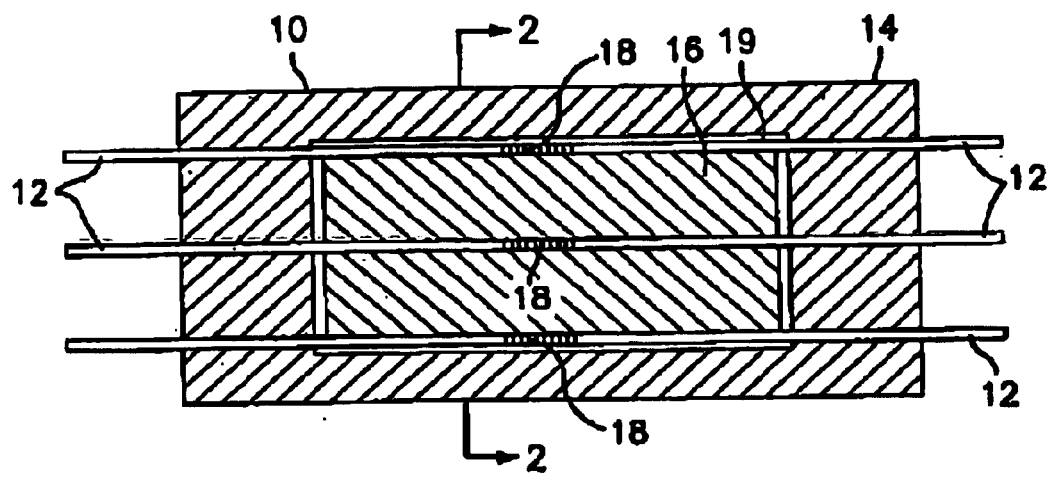
FIG. 1 is a sectional view of a sensing device in accordance with the present invention.
Figure 2:
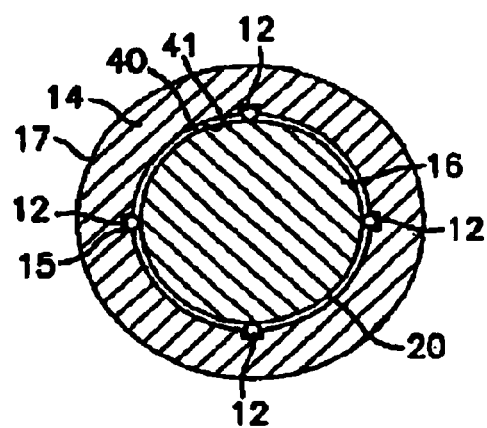
FIG. 2 is a sectional view of the sensing device of the present invention taken along lines 2—2 in FIG. 1.

A first embodiment of the sensing device of the present invention is shown in FIGS. 1 and 2. As shown therein, the sensing device 10 has a plurality of optical fibers 12 strung under tension inside a cage 14.

The side wall 17 of the cage 14 has a plurality of notches 15. The notches 15 serve two purposes. First, they keep the optical fibers 12 radially distributed in an even manner around a mass 16. Second, the notches 15 provide a space so that the optical fibers 12 are not crushed between the cage 14 and the mass 16 during shock events. Instead, the outside surface 40 of the mass 16 contacts the inside surface 41 of the cage 14, limiting the travel without crushing any of the optical fibers 12.

Figure 3:
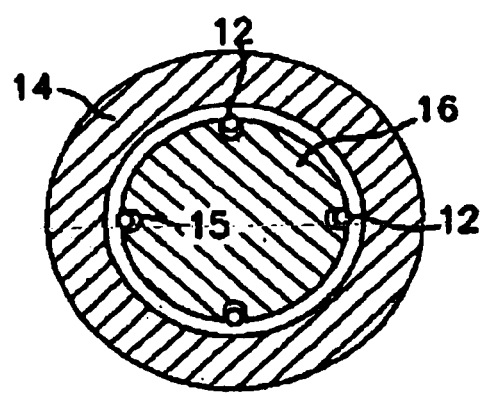
FIG. 3 shows an alternative embodiment of the sensing device of the present invention.

While FIG. 2 shows the notches 15 in the side wall of the cage 14, they could alternatively be located in the mass 16, instead of the cage, as shown in FIG. 3.

As can be seen from FIGS. 1 and 2, the mass 16 is suspended within a portion 19 of the cage 14 by the surrounding optical fibers 12. The mass 16 is initially in contact with all of the optical fibers 12. This places each of the optical fibers 12 in a prestrained state. If the device 10 is disposed vertically, all of the optical fibers 12 have the same prestrain. When the device 10 is disposed horizontally and rolls, the relationship of the optical fibers 12 and the mass 16 to the axis of the gravitational field changes. The optical fiber or fibers 12 on the bottom bear more weight and are strained greater than their initial prestrain. The optical fiber or fibers 12 on the top bear no weight and actually are strained less than their initial prestrain as the mass 16 moves off axis downward.

As can be seen from the foregoing description, as the device 10 rolls or pitches, the weight of the mass 16 will be directly borne by different combinations of the optical fibers 12. This leads to a different tension in each of the fibers 12.

A fiber optic Bragg grating 18 is written into the core of each optical fiber 12. The changing tension in each optical fiber 12 results in a wavelength shift of the reflectivity peak of the Bragg grating 18. Such a wavelength shift may then be measured by a variety of means already disclosed in the technical literature. For example, the measuring means may utilize a broadband light source such as an Erbium doped spontaneous emission source to illuminate the grating 18. The reflection is analyzed with a spectrum analyzer to determine the reflection peak wavelength. In another type of measuring means, a scanning single wavelength laser is used. The reflection versus the sun time is analyzed to determine the reflection peak wavelength. The difference in wavelength shift determines the difference in tension. The difference in tension between the optical fibers 12 allows direct calculation of the local direction of the gravitational field relative to the optical fibers 12 and the cage 14.

The gap 20 between the sides of the suspended mass 16 and the cage 14 is small so that the cage 14 limits the motion of the mass 16 in shock or high acceleration and limits the maximum tension seen by any optical fiber 12. The exact dimension of the gap 20 depends on the mass of the mass 16, the diameters of the optical fibers 12, and the number of optical fibers 12. The gap 20 must be large enough to accommodate the movement of the mass 16 away from the center as the device 10 rolls with some room to spare.

Because the gratings 18 reflect at a distinct wavelength, multiple sensors may be placed on the same optical fiber 12 with gratings 18 placed at different wavelengths. A plurality of gratings 18 comprising a single sensing device may be placed on separate optical fibers.

Figure 4:
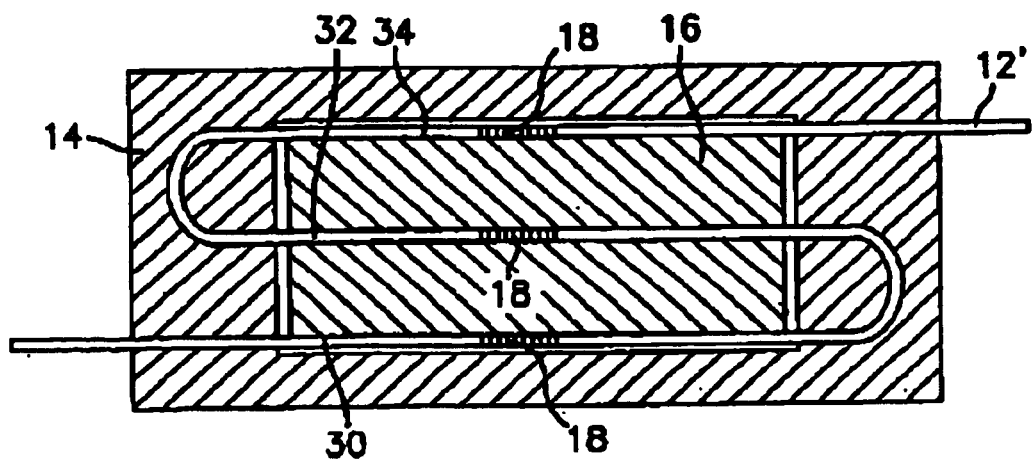
FIG. 4 shows yet another alternative embodiment of the sensing device of the present invention.

Referring now to FIG. 4, while it is preferred to use a plurality of optical fibers 12 in the sensor 10, it is possible to replace the plurality of optical fibers 12 by a single optical fiber 12' having a serpentine configuration formed by the optical fiber being formed into a winding path comprised of three legs 30, 32 and 34 (or more) in which each of the legs of the optical fiber 12' has a grating 18 incorporated therein.

In yet another alternative embodiment, the optic Bragg gratings 18 may be replaced by fiber optic Bragg grating laser sensors such as those described in U.S. Pat. No. 5,513,913. These are built into the optical fibers of the sensing device 10. Changes in the tension in each optical fiber 12 changes the wavelength of the light emitted by each laser.

The device of the present invention offers several new and distinct advantages. First, the sensing device 10 comprises a means for fiber optic sensing of roll or pitch. Further, the sensing device 10 of the present invention is simple and potentially inexpensive. Still further, the sensing device 10 may be multiplexed with many other such sensors on a single optical fiber.

It should be noted that the sensing device of the present invention may use a wide number of optical fibers 12. It is preferred that at least three optical fibers 12 are used in the sensing device.

It should also be noted the shape of the mass 16 may vary from that shown in the drawings. In such a situation, the optical fibers 12 may just enclose the mass 16 as shown or may be affixed to the mass 16.

The sensing device 10 of the present invention may be oriented into a towed array in different ways to function as either a roll or pitch sensor. Since the only deformable structures in the sensing device 10 are the optical fibers 12, sensitivity of the sensing device is maximized.

The sensing device 10 of the present invention may be used in other applications requiring a roll or pitch sensor such as a navigational system for an aircraft, a marine vessel, and the like.

It is apparent that there has been provided in accordance with the present invention a fiber optic motion sensor which fully satisfies the objects, means, and advantages set forth hereinbefore. While the present invention has been described in the context of specific embodiments thereof, other alternatives, modifications, and variations will become apparent to those skilled in the art having read the foregoing description. Therefore, it is intended to embrace those alternatives, modifications, and variations as fall within the broad scope of the appended claims.

What is claimed is:

1. A sensing device which comprises:
   at least one optical fiber supported in a structure;
   a movable mass supported within the structure; and
   means for detecting changes in tension in said at least one optical fiber due to movement of the movable mass;
   wherein said detecting means comprising at least one fiber optc Bragg grating written into a core of each fiber of said at least one optical fiber; and
   wherein said sensing device has a plurality of optical fibers and a first fiber optic Bragg grating associate with a first one of said optical fibers has a first reflective wavelength and a second fiber optic Bragg grating associated with a second one of said optical fibers has a second reflective wavelength, which second reflective wavelength is different from said first reflective wavelength.

2. A sensing device according to claim 1 wherein said detecting means comprises a plurality of fiber optic Bragg gratings associated with each of said optical fibers.

3. A sensing device according to claim 2 wherein each of said fiber optic Bragg gratings associated with each of said optical fibers has a different reflective wavelength.

4. A sensing device according to claim 1 wherein said detecting means comprises a fiber optic Bragg grating laser sensor associated with each of said optical fibers.

5. A sensing device which comprises:
   at least one optical fiber supported in a structure;
   a movable mass supported within the structure;
   means for detecting changes in tension in said at least one optical fiber due to movement of said movable mass; and
   said at least one optical fiber supported in said structure further being a plurality of optical fibers supported in said structure and said movable mass being surrounded by said optical fibers and being in contact with said optical fibers.

6. A sensing device according to claim 5, wherein said structure comprises a cage.

7. A sensing device according to claim 6 further comprising a gap between each side of said mass and said cage and said gap being sufficiently small to limit motion of said mass in shock or high acceleration and to limit the maximum tension seen by each of said optical fibers.

8. A sensing device which comprises:
   at least one optical fiber supported in a structure;
   a movable mass supported within the structure;
   means for detecting changes in tension in said at least one optical fiber due to movement of said movable in mass; and
   said at least one optical fiber comprises a single optical fiber having a serpentine configuration formed by the optical fiber being formed into a winding path comprised of at least three legs and wherein said detector means comprises a detector in each of the legs.

* * * * *